United States Patent
Hyslop

(10) Patent No.: US 11,438,057 B2
(45) Date of Patent: Sep. 6, 2022

(54) POSITION INFORMATION ASSISTED BEAMFORMING

(71) Applicant: SMARTSKY NETWORKS LLC, Charlotte, NC (US)

(72) Inventor: Douglas Hyslop, Vienna, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

(21) Appl. No.: 15/975,925

(22) Filed: May 10, 2018

(65) Prior Publication Data
US 2018/0262265 A1    Sep. 13, 2018

Related U.S. Application Data

(63) Continuation of application No. 13/833,178, filed on Mar. 15, 2013, now Pat. No. 9,998,202.

(51) Int. Cl.
*H04B 7/185* (2006.01)
(52) U.S. Cl.
CPC ............... *H04B 7/18506* (2013.01)
(58) Field of Classification Search
CPC .. H04B 7/18506; H04W 84/06; H04W 40/24; H04W 40/20
See application file for complete search history.

(56) References Cited

U.S. PATENT DOCUMENTS

| | | | |
|---|---|---|---|
| 3,940,597 A | 2/1976 | DiMatteo | |
| 5,047,779 A | 9/1991 | Hager, Jr. | |
| 5,488,737 A | 1/1996 | Harbin et al. | |
| 5,627,546 A | 5/1997 | Crow | |
| 6,018,659 A | 1/2000 | Ayyagari et al. | |
| 6,275,187 B1 | 8/2001 | Ross et al. | |
| 6,437,739 B1 | 8/2002 | Schulte et al. | |
| 6,952,631 B2 | 10/2005 | Griffith et al. | |
| 7,072,977 B1 | 7/2006 | Bernard et al. | |
| 7,356,389 B2 * | 4/2008 | Holst | H04L 67/06 701/3 |
| 7,379,750 B2 | 5/2008 | Jalali | |
| 7,684,802 B2 | 3/2010 | Jalali | |
| 7,933,599 B2 | 4/2011 | Fernandez-Corbaton et al. | |

(Continued)

FOREIGN PATENT DOCUMENTS

EP    1976152 A1 *    10/2008    ......... H04B 7/18506

OTHER PUBLICATIONS

International Search Report and Written Opinion of PCT/US2014/018134 dated Dec. 31, 2014, all enclosed pages cited.
(Continued)

*Primary Examiner* — Cassi J Galt
(74) *Attorney, Agent, or Firm* — Burr & Forman LLP

(57) ABSTRACT

A beamforming control module including processing circuitry may be configured to receive fixed position information indicative of a fixed geographic location of a base station, receive dynamic position information indicative of a three dimensional position of at least one mobile communication station, determine an expected relative position of a first network node relative to a second network node based on the fixed position information and the dynamic position information, and provide instructions to direct formation of a steerable beam from an antenna array of the second network node based on the expected relative position.

14 Claims, 4 Drawing Sheets

(56) References Cited

U.S. PATENT DOCUMENTS

| | | | |
|---|---|---|---|
| 8,385,211 | B2 | 2/2013 | Scarlatti et al. |
| 8,786,492 | B2 | 7/2014 | Fuss et al. |
| 8,798,638 | B2* | 8/2014 | Lane .................. H04W 4/029 |
| | | | 455/456.1 |
| 2001/0000123 | A1 | 4/2001 | Benjauthrit |
| 2005/0090201 | A1* | 4/2005 | Lengies ............. H04B 7/18506 |
| | | | 455/41.2 |
| 2005/0259571 | A1 | 11/2005 | Battou |
| 2006/0030350 | A1 | 2/2006 | Mitchell |
| 2006/0229070 | A1 | 10/2006 | De La Chapelle et al. |
| 2006/0239238 | A1 | 10/2006 | Fernandez-Corbaton et al. |
| 2007/0232299 | A1* | 10/2007 | Alcorn ............... H04B 7/18506 |
| | | | 455/431 |
| 2009/0092074 | A1 | 4/2009 | Jamalipour et al. |
| 2009/0154391 | A1 | 6/2009 | Wittenschlaeger |
| 2010/0087190 | A1 | 4/2010 | Pandit et al. |
| 2011/0182230 | A1 | 7/2011 | Ohm et al. |
| 2012/0200458 | A1 | 8/2012 | Jalali et al. |
| 2012/0202430 | A1 | 8/2012 | Jalali et al. |

OTHER PUBLICATIONS

Extended Search Report and Written Opinion of corresponding European application No. 14768745.3 dated Oct. 5, 2016, all enclosed pages cited.

Examination Report of corresponding European application No. 14768745.3 dated Feb. 28, 2018, all enclosed pages cited.

Communication pursuant to Article 94(3) EPC issued in corresponding European application No. 14768745.3 dated Sep. 11, 2019, all enclosed pages cited.

Examination report from corresponding European application No. 14768745.3 dated Nov. 7, 2018, all enclosed pages cited.

* cited by examiner

POSITION INFORMATION ASSISTED BEAMFORMING

CROSS REFERENCE TO RELATED APPLICATIONS

This application is a continuation of U.S. application Ser. No. 13/833,178 filed Mar. 15, 2013, the entire contents of which are hereby incorporated by reference in its entirety.

TECHNICAL FIELD

Example embodiments generally relate to wireless communications and, more particularly, relate to the use of position information to guide the direction of steerable antenna beams to facilitate wireless communication.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based communication systems have been developed and matured over the past couple of decades. While advances continue to be made in relation to ground based communication, and one might expect that some of those advances may also be applicable to communication with aviation platforms, the fact that conventional ground based communication involves a two dimensional coverage paradigm and that air-to-ground (ATG) communication is a three dimensional problem means that there is not a direct correlation between the two environments. Instead, many additional factors must be considered in the context of ATG relative to those considered in relation to ground based communication.

BRIEF SUMMARY OF SOME EXAMPLES

Some example embodiments may therefore be provided to enhance the ability of communication nodes that employ beamforming technology to communicate more efficiently and reliably. In some embodiments, a beamforming control module may be provided on either mobile nodes of an air-to-ground network or base stations of the network (or both). The beamforming control module may utilize position information of both the base stations and the mobile nodes to determine an expected relative position of one such platform from the other. The expected relative position may then be used for control of beamforming so that directionally steerable beams may be formed based on the expected relative position. Initial synchronization coverage ranges may therefore be enhanced and base stations of the network can be spaced farther apart.

In one example embodiment, a beamforming control module is provided. The beamforming control module may include processing circuitry configured to receive fixed position information indicative of fixed geographic locations of a plurality of base stations, receive dynamic position information indicative of a three dimensional position of at least one mobile communication station, determine an expected relative position of a first network node relative to a second network node based on the fixed position information and the dynamic position information, and provide instructions to direct formation of a steerable beam from an antenna array of the second network node based on the expected relative position.

In another example embodiment, an ATG network is provided. The network may include a plurality of base stations and at least one aircraft. The network may also include a beamforming control module. The beamforming control module may include processing circuitry configured to receive fixed position information indicative of fixed geographic locations of a plurality of base stations, receive dynamic position information indicative of a three dimensional position of at least one mobile communication station, determine an expected relative position of a first network node relative to a second network node based on the fixed position information and the dynamic position information, and provide instructions to direct formation of a steerable beam from an antenna array of the second network node based on the expected relative position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
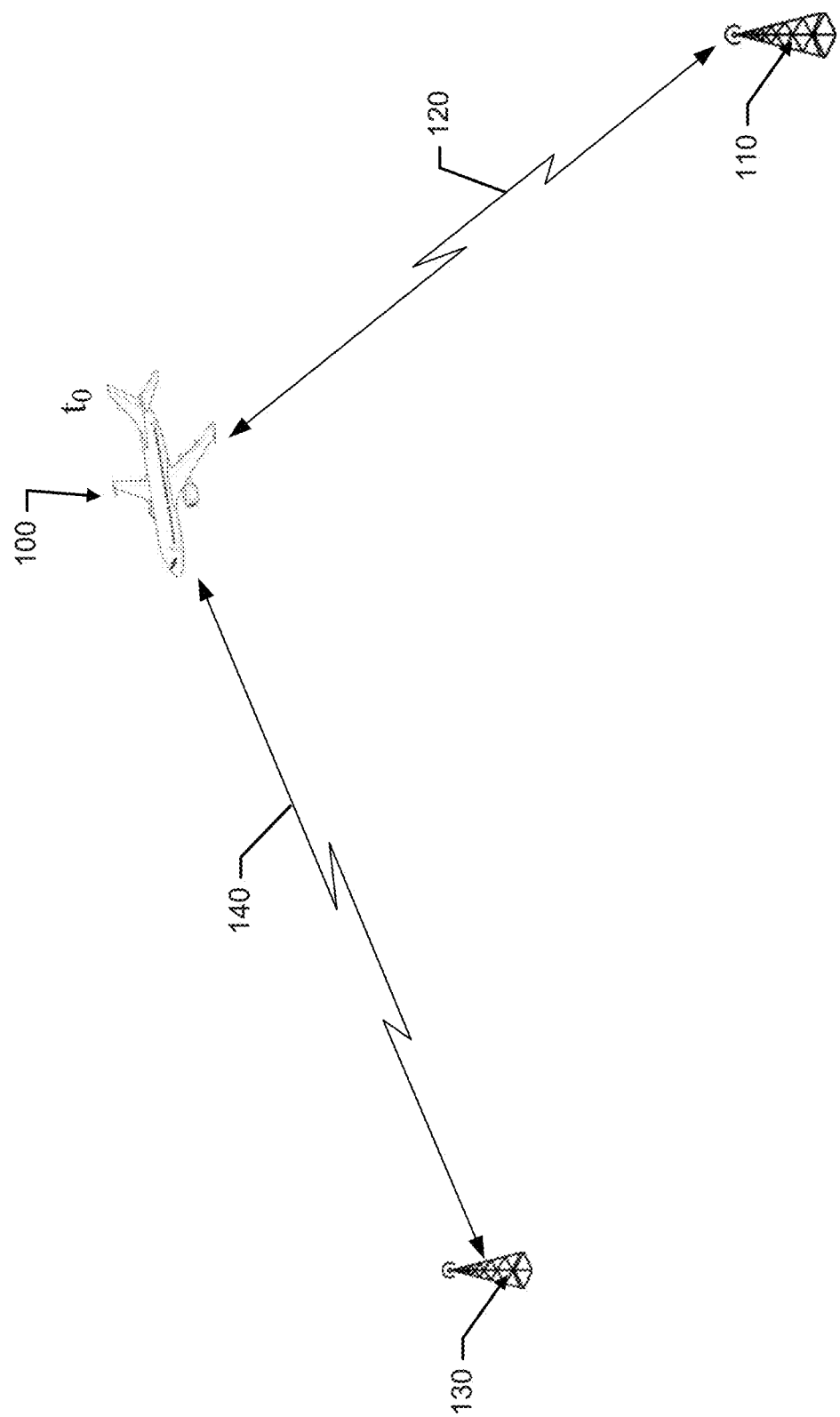
FIG. 1 illustrates an aircraft moving through the coverage areas of different base stations over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

Typical wireless communication systems include end-user devices, which may be used at a particular location or in a mobile setting, and a fixed set of equipment with access to interconnection to the Internet and/or the Public Switched Telephone Network (PSTN). The end user device communicates wirelessly with the fixed equipment, referred to as the base station.

In some embodiments, a base station employing beamforming may employ an antenna array to generate beams in the direction of the target device, enhancing the coverage range when the location of the device is known to the base station. When the location of the device is not known to the base station, then a beam may not be formed in the direction of the target airplane. In this case where beamforming is not present, the coverage range to the base station is reduced. The wireless system must be designed to provide for the lowest common denominator. If a device accessing the system for the first time has a less favorable coverage range, then the base stations must be placed closer together to ensure the unknown devices may gain access to the system. Placing the base stations closer together increases the network cost.

If a wireless device has not yet been in contact with the base station, then the device may end up with insufficient coverage margin to communicate with the base station because the beamforming gain is not present. Therefore, the initial synchronization of the wireless device with the base station is a potential problem in a wireless system employing beamforming. To address this potential problem, it may be possible to utilize position information of receiving stations and base stations to facilitate beamforming at either or both ends of the wireless communication links that are to be established.

In an air-to-ground (ATG) communications system, the end-user equipment (or receiving stations) may be installed or otherwise present on an airplane or other aerial platform. Thus, as mentioned above, the utilization of position information may not simply involve knowledge of latitude and longitude, relative positioning, global positioning system (GPS) coordinates, and/or the like. Instead, knowledge of three dimensional (3D) position information including altitude may be required. If the end-user equipment is installed with a GPS device or other means of tracking location, speed, and altitude, then this location-specific information may be employed by the wireless system to enhance the initial synchronization coverage range by enhancing beamforming. For example, a wireless device may be aware of its location in the three-dimensional airspace, and may be capable of deriving knowledge of the bearing and airspeed of the airplane.

One aspect of some example embodiments is to store the wireless network base station configuration in reconfigurable memory. The device, with its knowledge of location and heading, could assess the best-serving base station from this database and direct initial access requests toward the expected best-serving base station. This aspect of the invention enables beamforming by the device upon initial system access/synchronization. In some embodiments, the wireless system may employ assets to actively track all devices (e.g., all aircraft or other known receiving devices) in the 3D airspace. As an example, airplanes (or devices thereon) taking off from an airport may access and synchronize with a base station near the airport. Once known to the wireless system, each device may periodically transmit position information (e.g., coordinates, altitude, and speed) to the serving base station. The base station may share the position information with a centralized server or other device in the core network. The centralized server (or other processing device) may then track each device, compare the device location against a database of base stations in the system, and determine when a particular device may be moving into a different base station's coverage area. The device location may be shared with the new base station, and the new base station may then form a directional beam toward the wireless device to share synchronization information.

Example embodiments may therefore combine knowledge of fixed base stations positions (e.g., in 2D) with knowledge of moving receiving station positions (e.g., in 3D) to provide beamforming from both the airplane (or devices thereon) and the base station when the device has not yet acquired a neighboring base station. Full beamforming coverage benefits may therefore be maintained within an ATG system, reducing the cost of network coverage and improving handoff reliability. The improved gain by using directed beams may enable aircraft to engage in communications with potentially distant base stations on the ground. Accordingly, an ATG network may potentially be built with base stations that are much farther apart than the typical distance between base stations in a terrestrial network.

FIG. 1 illustrates a conceptual view of an aircraft moving through a coverage zone of different base stations to illustrate an example embodiment. As can be seen in FIG. 1, an aircraft 100 may be in communication with a first base station (BS) 110 at time to via a wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the wireless communication link 120.

The first BS 110 has a fixed position geographically and therefore position information regarding the location of the first BS 110 can be known. In some cases, an estimate of the coverage area defining the region in which first BS 110 is capable of providing wireless connectivity to aircraft may also be known or estimable (e.g., at the aircraft 100 and/or at the first BS 110). Meanwhile, the position of the aircraft in 3D space may also be known or estimable at any given time (e.g., at the aircraft 100 and/or at the first BS 110). Furthermore, it should be appreciated that the coverage area of the first BS 110 may possibly be altitude dependent, in some cases. In this regard, for example, the latitudinal and longitudinal coverage area projected onto the surface of the earth for the first BS 110 may be differently sized for different altitudes. Accordingly, for example, based on the known position and coverage characteristics of the first BS 110 and the position information of the aircraft 100 at time $t_0$, it may be determinable that the aircraft 100 is nearing or at the edge of the coverage area of the first BS 110 at time $t_0$.

A second BS 130, which may have similar performance and functional characteristics to those of the first BS 110, may be located geographically such that, for the current track of the aircraft 100, the second BS 130 is a candidate for handover of the aircraft 100 to maintain a continuous and uninterrupted communication link between the aircraft 100 and ground-based base stations of an ATG wireless communication network at time $t_0$. As discussed above, it may be helpful for the second BS 130 to be aware of the approach of the aircraft 100 so that the second BS 130 can employ beamforming techniques to direct a beam toward the aircraft 100. Additionally or alternatively, it may be helpful for the aircraft 100 to be aware of the existence and location of the second BS 130 so that the wireless communication equipment on the aircraft 100 may employ beamforming techniques to direct a beam toward the second BS 130. Thus, at least one of the second BS 130 or the wireless communication equipment on the aircraft 100 may employ beamforming techniques assisted by knowledge of position information to facilitate establishment of the wireless communication link 140 between the wireless communication equipment on the aircraft 100 and the second BS 130.

Figure 2:
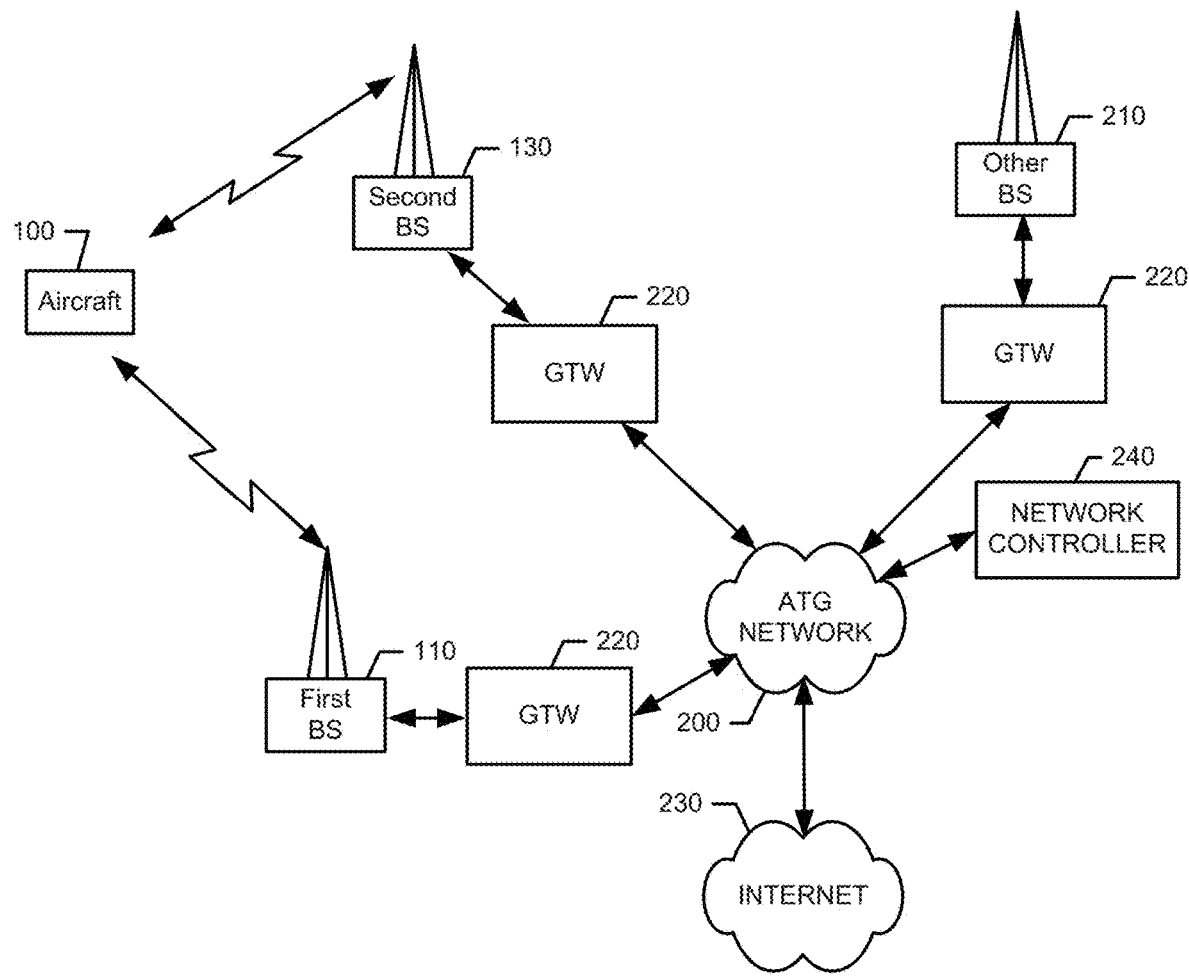
FIG. 2 illustrates a block diagram of a system for employing positional information for assisting with beamforming in accordance with an example embodiment.

In accordance with an example embodiment, a beamforming control module may be provided that employs both 2D knowledge of fixed base station location and 3D knowledge of position information regarding a receiving station on an aircraft to assist in application of beamforming techniques. The beamforming control module of an example embodiment may be physically located at any of a number of different locations within an ATG communication network. FIG. 2 illustrates a functional block diagram of an ATG communication network that may employ an example embodiment of such a beamforming control module.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from the mobile terminal 10, and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz.

As indicated above, a beamforming control module may be employed on wireless communication equipment at either or both of the network side or the aircraft side in example embodiments. Thus, in some embodiments, the beamforming control module may be implemented in a receiving station on the aircraft (e.g., a passenger device or device associated with the aircraft's communication system). In some embodiments, the beamforming control module may be implemented in the network controller 240 or at some other network side entity.

Figure 3:
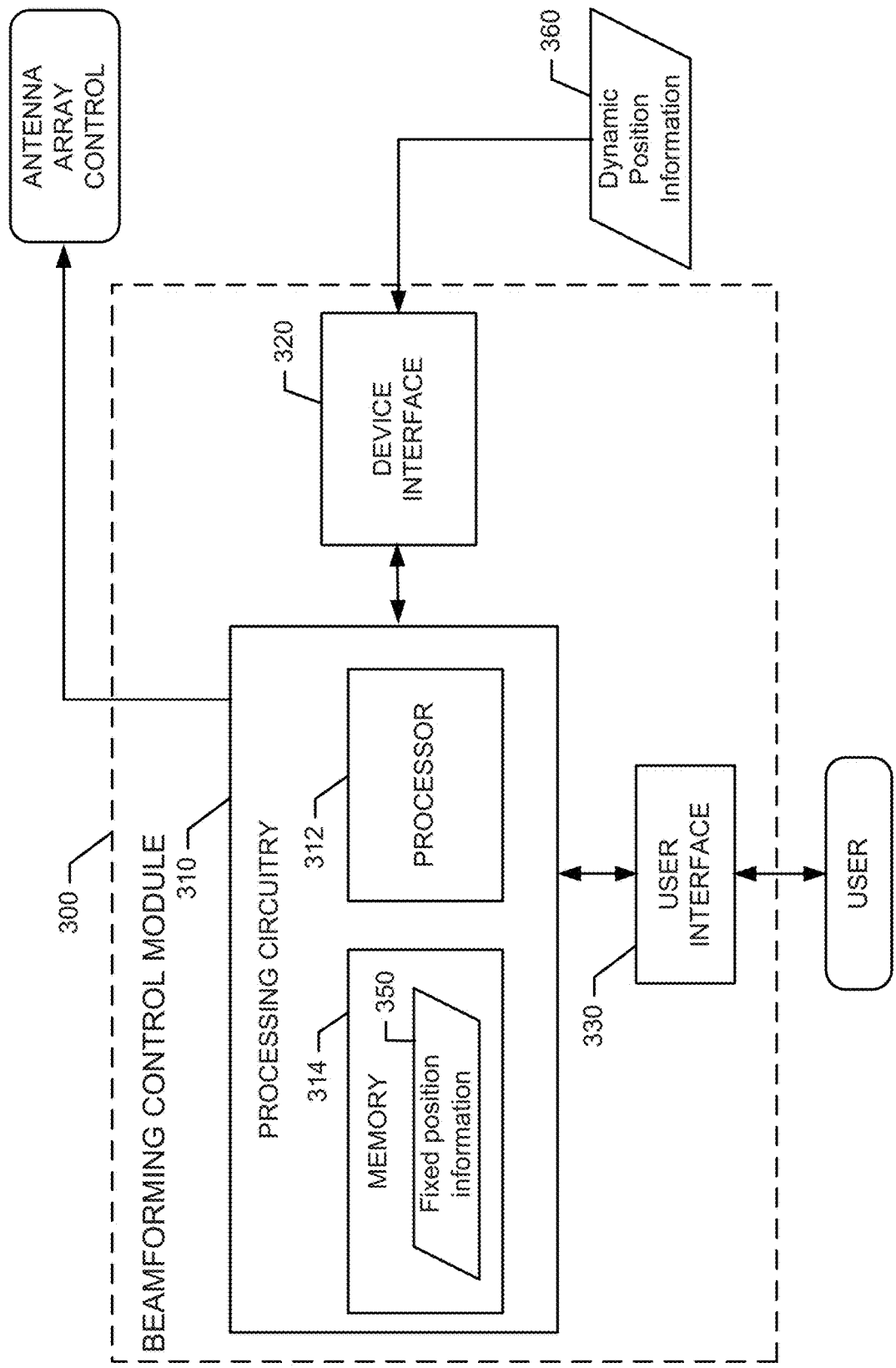
FIG. 3 illustrates control circuitry that may be employed to assist in using positional information for assisting with beamforming according to an example embodiment.

FIG. 3 illustrates the architecture of a beamforming control module 300 in accordance with an example embodiment. The beamforming control module 300 processing circuitry 310 configured to provide control outputs for generation of beams from an antenna array disposed at either the aircraft 100 or one of the base stations based on processing of various input information. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 200.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display, one or more levers, switches, indicator lights, buttons or keys (e.g., function buttons), and/or other input/output mechanisms.

The device interface 320 may include one or more interface mechanisms for enabling communication with other devices (e.g., modules, entities, sensors and/or other components of the ATG network 200). In some cases, the device interface 320 may be any means such as a device or circuitry embodied in either hardware, or a combination of hardware and software that is configured to receive and/or transmit data from/to modules, entities, sensors and/or other components of the ATG network 200 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the beamforming control module 300 based on inputs received by the processing circuitry 310 responsive to receipt of position information associated with various relative positions of the communicating elements of the network. As such, in some embodiments, the processor 312 (or the processing circuitry 310) may be said to cause each of the operations described in connection with the beamforming control module 300 in relation to adjustments to be made to antenna arrays to undertake the corresponding functionalities relating to beamforming responsive to execution of instructions or algorithms configuring the processor 312 (or processing circuitry 310) accordingly. In particular, the instructions may include instructions for processing 3D position information of a moving receiving station (e.g., on an aircraft) along with 2D position information of fixed transmission sites in order to instruct an antenna array to form a beam in a direction that will facilitate establishing a communication link between the moving receiving station and one of the fixed transmission stations as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the beamforming control module 300 as described herein.

In an example embodiment, the memory 314 may store fixed position information 350 indicative of a fixed geographic location of at least one base station. In some embodiments, the fixed position information 350 may be indicative of the fixed geographic location of a single base station of the ATG network 200. However, in other embodiments, the fixed position information 350 may be indicative of the fixed geographic location of multiple ones (or even all) of the base stations of the ATG network 200. In other embodiments, the fixed position information 350 may be stored at another memory device either onboard the aircraft 100 or accessible to the network controller 240. However, regardless of the storage location of the fixed position information 350, such information may be read out of memory and provided to (and therefore also received at) the processing circuitry 310 for processing in accordance with an example embodiment.

The processing circuitry 310 may also be configured to receive dynamic position information 360 indicative of a three dimensional position of at least one mobile communication station (which should be appreciated to be capable of transmission and reception of signaling in connection with two way communication). The mobile communication station may be a passenger device onboard the aircraft 100, or may be a wireless communication device of the aircraft 100 itself. The wireless communication device of the aircraft 100 may transfer information to and from passenger devices (with or without intermediate storage), or may transfer information to and from other aircraft communications equipment (with or without intermediate storage).

In an example embodiment, the processing circuitry 310 may be configured to determine an expected relative position of a first network node (e.g., one of the base station or the mobile communication station) relative to a second network node (e.g., the other one of the base station or the mobile communication station) based on the fixed position information 350 and the dynamic position information 360. In other words, the processing circuitry 310 may be configured to utilize information indicative of the locations of two devices or network nodes and determine where the network nodes are relative to one another from the perspective of either one of the network nodes (or both). Tracking algorithms may be employed to track dynamic position changes and/or calculate future positions based on current location and rate and direction of movement. After the expected relative position is determined, the processing circuitry 310 may be configured to provide instructions to direct formation of a steerable beam from an antenna array of the second network node based on the expected relative position. The instructions may be provided to a control device that is configured to adjust characteristics of an antenna array (of either the mobile communication station or the base station) to form directionally steerable beams steered in the direction of the expected relative position. Such steerable beams may, for example, have azimuth and elevation angle widths of 5 degrees or less. Moreover, in some cases, such steerable beams may have azimuth and elevation angle widths of 2 degrees or less. However, larger sized steerable beams may also be employed in some embodiments.

In an example embodiment, the first network node may be disposed at (or be) the base station, and the second network node may be disposed at the mobile communication station (e.g., the aircraft 100 or communication equipment thereon). However, alternatively, the first network node could be the mobile communication station, and the second network node could be at the base station. Furthermore, multiple instances of the beamforming control module 300 may be provided so that both the mobile communication station and the base station may employ the beamforming control module 300. Alternatively or additionally, multiple instances of the beamforming control module 300 may be provided on multiple aircraft and/or on multiple base stations so that each device (or at least multiple devices) within the ATG network 200 may be able to direct steerable beams toward other devices in the network on the basis of using position information to estimate the relative position of a device to focus a beam toward the expected or estimated relative position.

In some embodiments, regardless of where the beamforming control module 300 is instantiated, determining the expected relative position may include determining a future mobile communication station position and corresponding estimated time at which the mobile communication station will be at the future mobile communication station position. In other words, the processing circuitry 310 may be configured to utilize the dynamic position information to not only determine a current position of the mobile communication station, but to further determine a future position of the mobile communication station so that, for example, the expected relative position may be determined for some future time at which at beam may be focused based on the expected relative position to establish a communication link with a moving aircraft or communication equipment thereon.

In an example embodiment, the dynamic position information 360 may include latitude and longitude coordinates and altitude to provide a position in 3D space. In some cases, the dynamic position information 360 may further include heading and speed so that calculations can be made to determine, based on current location in 3D space, and the heading and speed (and perhaps also rate of change of altitude), a future location of the aircraft 100 at some future time. In some cases, flight plan information may also be used for predictive purposes to either prepare assets for future beamforming actions that are likely to be needed, or to provide planning for network asset management purposes. In some embodiments, the beamforming control module 300 may be disposed at the aircraft 100. In such cases, the fixed position information 350 may be provided for multiple base stations to define the network topology and may be stored in a memory device (e.g., memory 314) onboard the aircraft 100.

The dynamic position information 360 may be determined by any suitable method, or using any suitable devices. For example, the dynamic position information 360 may be determined using global positioning system (GPS) information onboard the aircraft 100, based on triangulation of aircraft position based on a direction from which a plurality of signals arrive at the aircraft 100 from respective ones of the base stations, using aircraft altimeter information, using radar information, and/or the like, either alone or in combination with each other.

In an example embodiment, the beamforming control module 300 may be disposed at the network controller 240, which may be in communication with the base stations of the ATG network 200. In such an example, the beamforming control module 300 may be configured to receive dynamic position information 360 for a plurality of aircraft, and to provide expected relative position information for each aircraft relative to one of the base stations. Alternatively or additionally, the beamforming control module 300 may be configured to receive dynamic position information, and to provide expected relative position information for at least one aircraft relative to at least two base stations. In still other embodiments, the beamforming control module 300 may additionally or alternatively be configured to receive dynamic position information, and to provide multiple expected relative positions for respective different aircraft with respect to multiple base stations.

In some example embodiments, the beamforming control module 300 may further be configured to operate in a mesh network context. For example, the beamforming control module 300 may be configured to utilize dynamic position information associated with multiple aircraft in order to form mesh communication links between aircraft. Thus, for example, one aircraft could relay information to another aircraft from a terrestrial base station. In such an example, the expected relative position may be a relative position between two aircraft. In some embodiments, multiple "hops" between aircraft may be accomplished to reach remotely located aircraft, or even to provide self healing in a network where a particular ground station is not operating, but there are other aircraft in the area that can relay information to fill in the coverage gaps left by the non-operating ground station.

Figure 4:
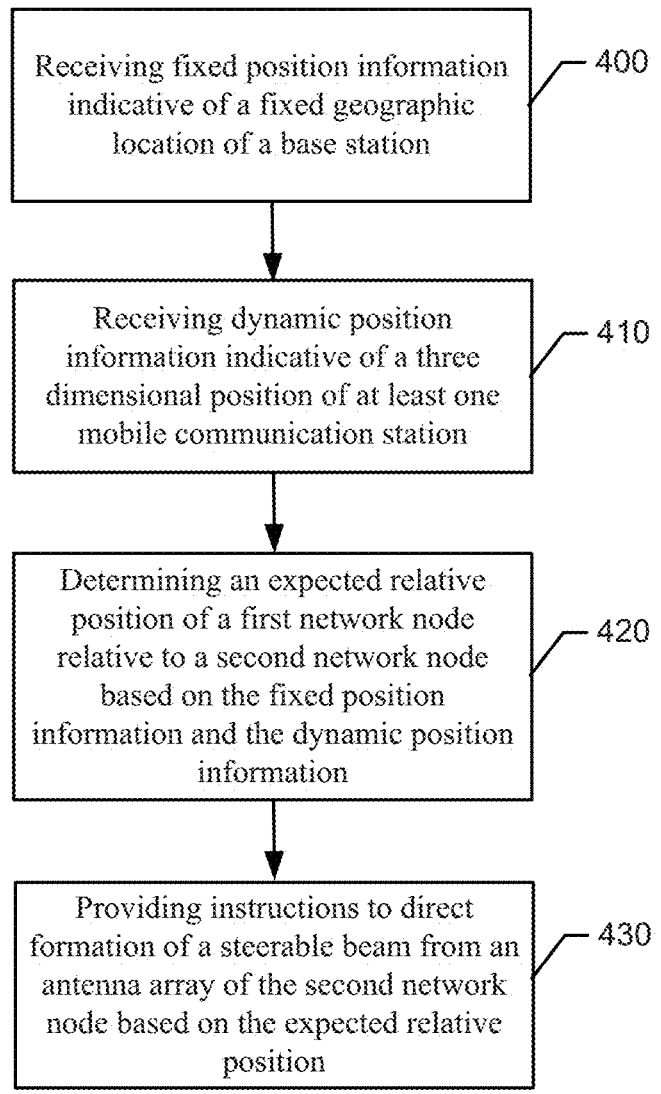
FIG. 4 illustrates a block diagram of a method for employing positional information for assisting with beamforming in accordance with an example embodiment.

As such, the system of FIG. 2 may provide an environment in which the control module of FIG. 3 may provide a mechanism via which a number of useful methods may be practiced. FIG. 4 illustrates a block diagram of one method that may be associated with the system of FIG. 2 and the control module of FIG. 3. From a technical perspective, the beamforming control module 300 described above may be used to support some or all of the operations described in FIG. 4. As such, the platform described in FIG. 2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the network controller 240, a base station, the aircraft 100, a passenger or other communication device on the aircraft 100, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving fixed position information indicative of a fixed geographic location of a base station at operation 400. The method may further include, receiving dynamic position information indicative of a three dimensional position of at least one mobile communication station at operation 410 and determining an expected relative position of a first network node relative to a second network node based on the fixed position information and the dynamic position information at operation 420. The method may further include providing instructions to direct formation of a steerable beam from an antenna array of the second network node based on the expected relative position at operation 430.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A system comprising:
a base station and a second base station of an air-to-ground (ATG) communication network; and
a wireless communication device on an aircraft, the wireless communication device comprising an antenna array and a beamforming control module configured to interface with the antenna array to generate a steerable beam, the beamforming control module comprising processing circuitry configured to, prior to initial attachment of the wireless communication device of the aircraft to the ATG communication network:
receive fixed position information indicative of a fixed geographic location of the base station and the second base station of the ATG communication network;
receive dynamic position information indicative of a three dimensional position of the aircraft;
determine an expected relative position of the aircraft relative to the base station and the second base station based on the fixed position information and the dynamic position information; and
provide instructions to direct formation of the steerable beam from the antenna array of the aircraft to the base station to provide an initial access request to the base station based on the expected relative position to establish initial synchronization of the wireless communication device with the base station of the ATG communication network, the steerable beam being formed in an unlicensed frequency band using a frequency of 2.4 GHz or 5.8 GHz,
wherein the second base station is configured to determine a second expected relative position to enable the second base station to direct predictive formation of a second steerable beam from the second base station to the aircraft, the second expected relative position being determined by determining a future aircraft position and corresponding estimated future time at which the aircraft will be at the future aircraft position to direct the second steerable beam from the second base station based on the future aircraft position to prepare for a future need for the second steerable beam with the second base station and before handover from the base station to the second base station.

2. The system of claim 1, wherein the dynamic position information comprises latitude and longitude coordinates and altitude of an aircraft.

3. The system of claim 2, wherein the dynamic position information further comprises heading and speed of the aircraft.

4. The system of claim 1, wherein the fixed position information is stored in a memory device onboard the aircraft, the fixed position information including locations of a plurality of base stations of a network.

5. The system of claim 1, wherein the dynamic position information is determined using global positioning system (GPS) information.

6. The system of claim 1, wherein the dynamic position information is determined based on triangulation of aircraft position based on a direction from which a plurality of signals arrive at the aircraft from respective ones of a plurality of base stations.

7. The system of claim 1, wherein the dynamic position information is determined using aircraft altimeter information.

8. The system of claim 1, wherein the dynamic position information is determined using radar information.

9. The system of claim 1, wherein the beamforming control module is configured to receive multiple instances of dynamic position information for a plurality of aircraft, and to provide expected relative position information for each aircraft relative to one of the base stations of the network.

10. The system of claim 1, wherein the beamforming control module is configured to receive dynamic position information, and to provide multiple expected relative positions for respective different aircraft with respect to multiple base stations.

11. The system of claim 1, wherein the steerable beam is formed predictively based on a flight plan of the aircraft.

12. The system of claim 1, wherein the second steerable beam is formed in the unlicensed frequency band using a frequency of about 2.4 GHz.

13. The system of claim 1, wherein the second steerable beam is formed in the unlicensed frequency band using a frequency of about 5.8 GHz.

14. The system of claim 1, wherein the second steerable beam has a differently sized latitudinal and longitudinal coverage area projected onto a surface of the earth at respective different altitudes.

\* \* \* \* \*